(12) United States Patent
Etling et al.

(10) Patent No.: US 10,549,838 B2
(45) Date of Patent: Feb. 4, 2020

(54) FLEXIBLE CONTROL SURFACES AND RELATED METHODS

(71) Applicant: The Boeing Company, Chicago, IL (US)

(72) Inventors: Keith Allan Etling, Shiloh, IL (US); Jennifer R. Green, St. Louis, MO (US); Stephen L. Spicknall, Weldon Spring, MO (US)

(73) Assignee: The Boeing Company, Chicago, IL (US)

( * ) Notice: Subject to any disclaimer, the term of this patent is extended or adjusted under 35 U.S.C. 154(b) by 227 days.

(21) Appl. No.: 15/452,993

(22) Filed: Mar. 8, 2017

(65) Prior Publication Data

US 2018/0257759 A1    Sep. 13, 2018

(51) Int. Cl.
*B64C 3/26* (2006.01)
*B64C 3/44* (2006.01)

(52) U.S. Cl.
CPC .......... *B64C 3/26* (2013.01); *B64C 2003/445* (2013.01)

(58) Field of Classification Search
CPC ....... B64C 9/08; B64C 2003/445; B64C 3/26; Y02T 50/14
See application file for complete search history.

(56) References Cited

U.S. PATENT DOCUMENTS

| | | |
|---|---|---|
| 3,991,245 A | 11/1976 | Jackson |
| 5,222,699 A | 6/1993 | Albach et al. |
| 5,431,980 A | 7/1995 | McCarthy |
| 5,518,210 A | 5/1996 | Friberg |
| 5,662,294 A * | 9/1997 | Maclean ................... B63B 1/28  114/140 |
| 5,794,893 A | 8/1998 | Diller et al. |
| 5,803,405 A | 9/1998 | Ellis et al. |
| 5,810,291 A | 9/1998 | Geiger et al. |
| 5,927,651 A | 7/1999 | Geders et al. |
| 5,931,422 A | 8/1999 | Geiger et al. |
| 5,941,480 A | 8/1999 | Wille |
| 6,015,115 A | 1/2000 | Dorsett et al. |
| 6,027,074 A | 2/2000 | Cameron et al. |
| 6,145,791 A | 11/2000 | Diller et al. |
| 6,173,924 B1 | 1/2001 | Young et al. |
| 6,173,925 B1 | 1/2001 | Mueller et al. |
| 6,209,824 B1 | 4/2001 | Caton et al. |
| 6,227,498 B1 | 5/2001 | Arata |

(Continued)

FOREIGN PATENT DOCUMENTS

| EP | 2397403 | 12/2011 |
|---|---|---|
| EP | 2987628 | 2/2016 |

OTHER PUBLICATIONS

European Patent Office, "Extended European Search Report," issued in connection with European Patent Application No. 181602723, dated Apr. 26, 2018, 11 pages.

(Continued)

*Primary Examiner* — Jessica B Wong
(74) *Attorney, Agent, or Firm* — Hanley, Flight & Zimmerman, LLC

(57) ABSTRACT

Flexible control surfaces and related methods are disclosed. Example apparatus disclosed herein include an airfoil including a skin, the skin having perforations filled with an elastomer to increase a flexibility of the skin; and a flexible core adjacent the perforations of the skin to support the skin.

20 Claims, 13 Drawing Sheets

(56) References Cited

U.S. PATENT DOCUMENTS

| | | | |
|---|---|---|---|
| 6,349,903 B2 | 2/2002 | Caton et al. | |
| 6,375,122 B1 | 4/2002 | Cameron et al. | |
| 6,575,407 B2 | 6/2003 | McCallum et al. | |
| 7,108,231 B2 | 9/2006 | Perez-Sanchez | |
| 8,342,447 B2 | 1/2013 | Etling | |
| 2005/0151015 A1 | 7/2005 | Cagle et al. | |
| 2006/0163431 A1 | 7/2006 | Dittrich | |
| 2007/0138341 A1 | 6/2007 | Joshi et al. | |
| 2009/0269198 A1* | 10/2009 | Grohmann | B64C 27/615 416/23 |
| 2013/0064666 A1 | 3/2013 | Thomas et al. | |
| 2017/0259907 A1* | 9/2017 | Arata | B64C 9/02 |

OTHER PUBLICATIONS

European Patent Office, "Communication pursuant to Article 94(3) EPC," issued in connection with European Patent Application No. 18160272.3, dated May 9, 2019, 5 pages.

European Patent Office, "Communication pursuant to Article 94(3) EPC," issued in connection with European Patent Application No. 18160272.3, dated Nov. 21, 2019, 5 pages.

* cited by examiner

FLEXIBLE CONTROL SURFACES AND RELATED METHODS

This disclosure relates generally to aircraft and, more particularly, to flexible control surfaces and related methods.

BACKGROUND

Aircraft are typically equipped with control surfaces to maneuver the aircraft during flight. The control surfaces are typically hingedly attached to wings. As the control surfaces are rotated with respect to the wings, air flowing over the wings is deflected and causes the attitude and/or flight path of the aircraft to change. Based on the locations and relative rotation directions of the control surfaces, the aircraft may ascend, descend, roll, and/or turn. Further, deflection of the control surfaces may slow the aircraft, for example, in preparation for landing.

SUMMARY

In one example, an apparatus includes an airfoil including a skin, the skin having perforations filled with an elastomer to increase a flexibility of the skin; and a flexible core adjacent the perforations of the skin to support the skin.

In another example, an apparatus includes a control surface of an aircraft, the control surface having a flexible core and a flexible skin covering the flexible core, the flexible skin including a plurality of elastomer filled openings to increase a flexibility of the skin.

In another example, a method includes deflecting a control surface of an aircraft a first amount; maintaining a position of a seal over a gap between the deflected control surface and an airfoil of the aircraft when the control surface is deflected the first amount to maintain a seamless transition between the deflected control surface and the airfoil to reduce pressure leakage across opposing surfaces of the airfoil; and deflecting the control surface a second amount greater than the first amount such that the control surface and the airfoil establish an abrupt transition at the gap between the control surface and the airfoil.

Figure 1:
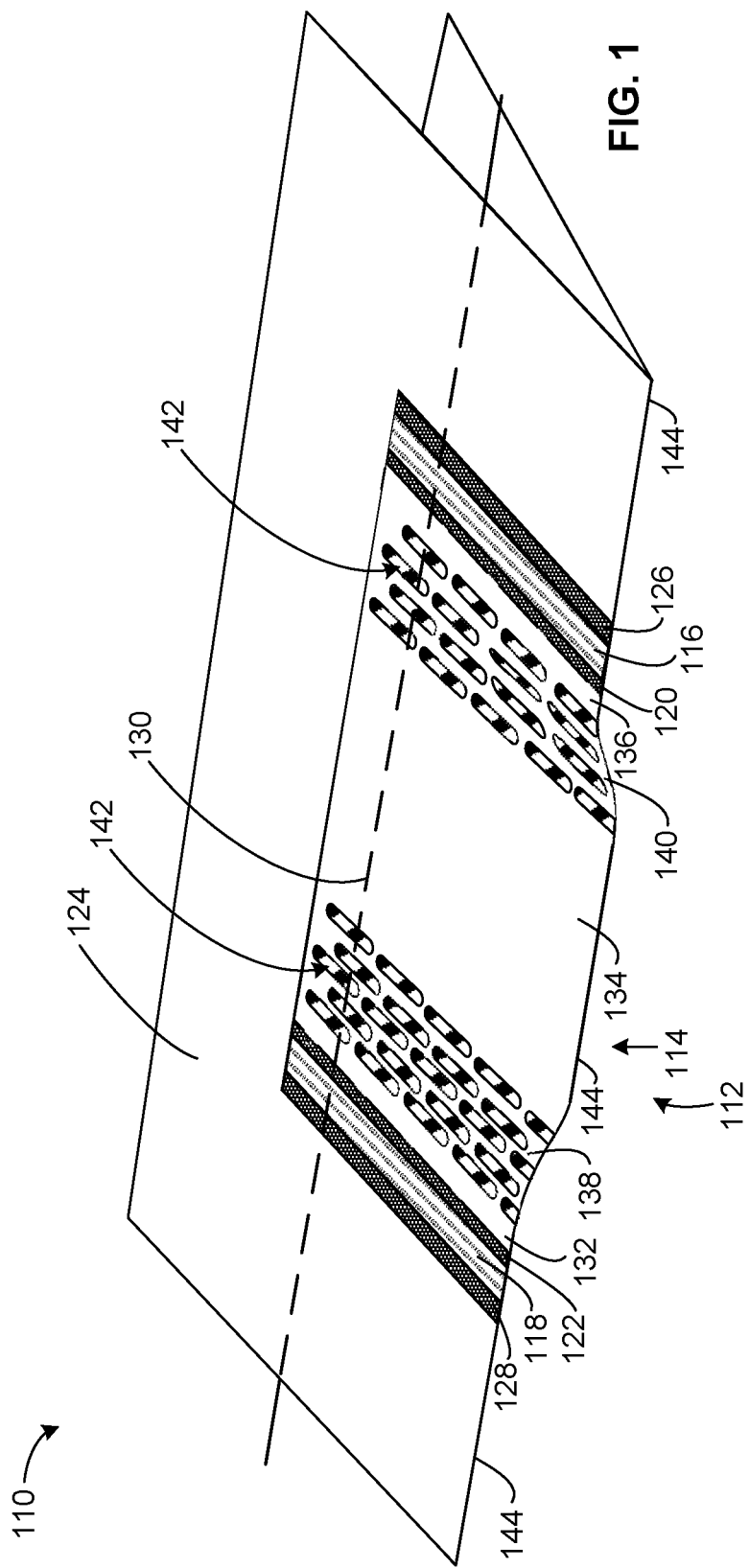
FIG. 1 is a top perspective view of a wing implemented with an example control surface of described herein.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

In general, the example flexible control surfaces described herein may be used with aircraft wings to provide improved aerodynamics over the wings. The example flexible control surfaces described herein provide significantly increased efficiency of air movement over the wings of aircraft (e.g., reduce drag) during maneuvering and in-flight aircraft attitude adjustments. Further, the example flexible control surfaces described herein include fewer and lighter components than some known control surfaces. Thus, the example flexible control surfaces described herein provide significantly increased fuel efficiency and/or range to aircraft.

Example flexible control surfaces described herein are composed of a flexible portion and opposing rotatable seals. Unlike the above-mentioned known control surfaces, the flexible control surfaces described herein flex (e.g., bend, deflect, twist, warp, etc.) to provide a continuous substantially smooth geometrically variable wing surface to achieve relatively small aircraft maneuvers. Additionally, the flexible control surfaces articulate (e.g., rotate relative to the wing) to provide a discontinuous wing surface to achieve relatively large aircraft maneuvers. More specifically, the flexible portion includes a corrugated core adhered to a partially perforated skin to produce rigid and flexible regions of the flexible portion. The opposing rotatable seals are engaged with inboard and outboard ends of the flexible portion. By rotating the rigid regions of the flexible portion relative to one another to flex the flexible regions and sealing the inboard and outboard ends of the flexible portion with adjacent portions of an aircraft wing, the overall shape and, thus, aerodynamics of the wing are changed without creating abrupt changes in the surface of the wing. As a result, air is smoothly deflected over the wing to maneuver the aircraft with minimized drag when making relatively small aircraft attitude and/or flight path adjustments. Further, by rotating or articulating the flexible portion and releasing the opposing seals at the inboard and outboard ends of the flexible portion, abrupt changes are produced in the surface of the wing. As a result, air is turbulently deflected over the wing to slow the aircraft and/or make sudden and/or relatively large maneuvers. Therefore, the flexible control surfaces described herein can provide both smooth (e.g., continuous) and abrupt changes to wing geometry.

FIG. 1 is a top perspective view of a wing 110 implemented with an example control surface 112 described herein. In the illustrated example of FIG. 1, the control surface 112 includes a flexible portion 114, an inboard articulating seal 116, an outboard articulating seal 118, a first inboard cap 120, and a first outboard cap 122. The wing 110 includes an airfoil surface 124, a second inboard cap 126, a second outboard cap 128, and a hinge line 130 (hidden in FIG. 1 and denoted by a dashed line). The hinge line 130 is a rod extending through the wing 110 about which the control surface 112 rotates. The wing 110 also includes a first actuator, a second actuator, and a third actuator (not shown in FIG. 1). The first, second, and third actuators are disposed inside the wing 110. The flexible portion 114 includes a first rigid region 132, a second rigid region 134, a third rigid region 136, a first flexible region 138, and a second flexible region 140. The first outboard cap 122 is attached (e.g., adhered, glued, engaged to, fastened to, cemented to, etc.) to the first rigid region 132. The first inboard cap 120 is attached to the third rigid region 136. The first rigid region 132 is connected to the first actuator. The second rigid region 134 is connected to the second actuator. The third rigid region 136 is connected to the third actuator. The first flexible region 138 and the second flexible region 140 are defined by perforations 142 in the flexible portion 114. The perforations 142 are filled with an elastomer and will be described in greater detail in conjunction with FIGS. 7, 8, 9, and 12.

In the illustrated example of FIG. 1, the second rigid region 134 is rotated downwardly relative to the wing 110 about the hinge line 130 by the second actuator while the first rigid region 132 and the first outboard cap 122 are held stationary with respect to the wing 110 by the first actuator. Also, the third rigid region 136 and the first inboard cap 120 are held stationary with respect to the wing 110 by the third actuator. Thus, the first and second flexible regions 138, 140 are flexed to smoothly deflect a trailing edge 144 of the wing 110 downward. Thus, the first and second flexible regions 138, 140 provide smooth transitions between the first, second, and third rigid regions 132, 134, 136.

Figure 2:
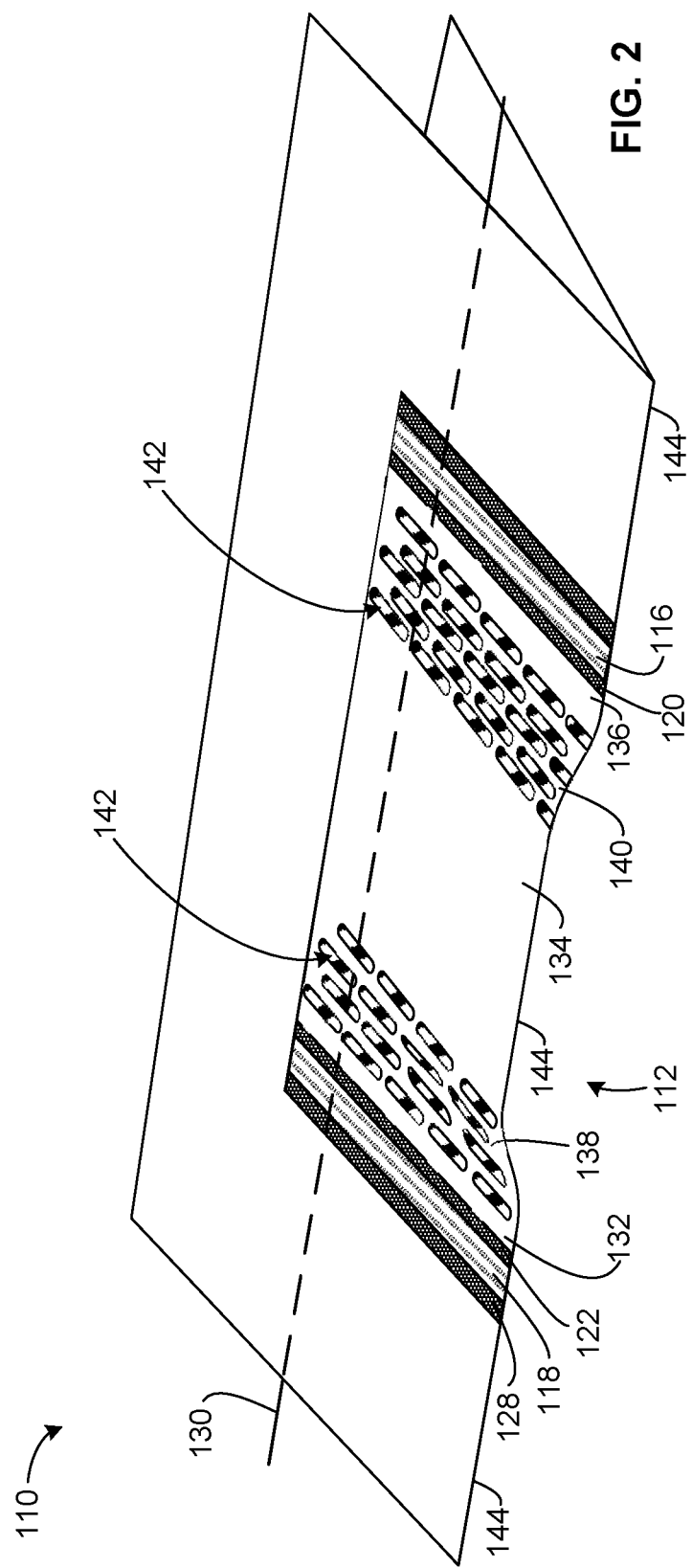
FIG. 2 illustrates the example control surface of FIG. 1 flexed upwardly.

FIG. 2 illustrates the example control surface 112 of FIG. 1 flexed upwardly. In the illustrated example of FIG. 2, the second rigid region 134 is rotated upwardly relative to the wing 110 about the hinge line 130 (hidden in FIG. 2 and denoted by a dashed line) by the second actuator while the first rigid region 132 and the first outboard cap 122 are held stationary with respect to the wing 110 by the first actuator and the third rigid region 136 and the first inboard cap 120 are held stationary with respect to the wing 110 by the third actuator. Thus, the first and second flexible regions 138, 140 are flexed to smoothly deflect the trailing edge 144 of the wing 110 upward.

Figure 3:
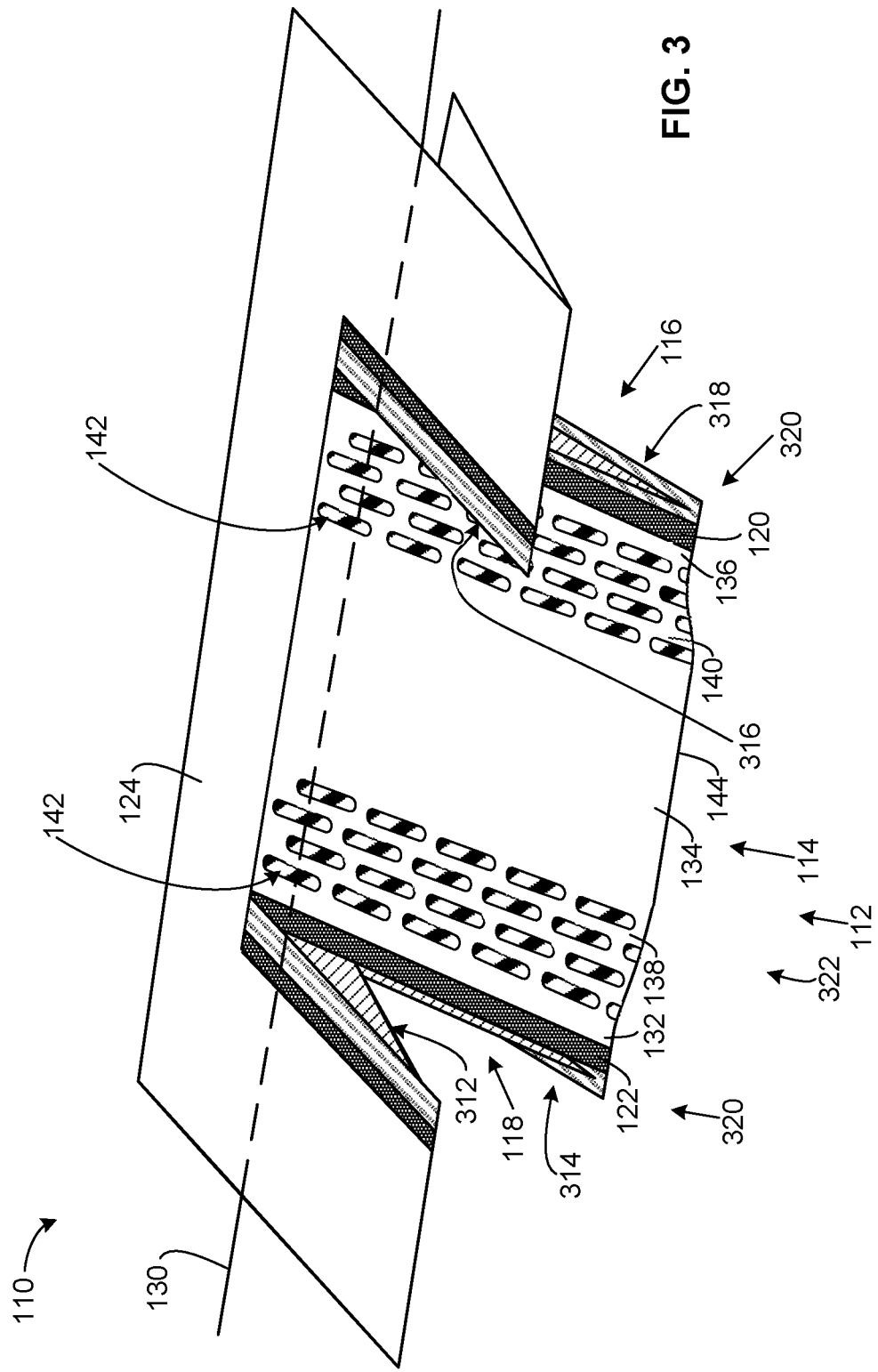
FIG. 3 illustrates the example control surface of FIG. 1 articulated downwardly.

FIG. 3 illustrates the example control surface of FIG. 1 articulated downwardly. As shown in FIG. 3, the outboard articulating seal 118 includes a first upper seal assembly 312 and a first lower seal assembly 314. The first upper seal assembly 312 is rotatably (e.g., articualbly, pivotably, swingably, hingedly, etc.) engaged with the first lower seal assembly 314 about the hinge line 130 (hidden in FIG. 3 and denoted as a dashed line). As shown in FIG. 3, the inboard articulating seal 116 includes a second upper seal assembly 316 and a second lower seal assembly 318. The second upper seal assembly 316 is rotatably engaged with the second lower seal assembly 318 about the hinge line 130.

In the illustrated example of FIG. 3, the first rigid region 132, the first outboard cap 122, and the first lower seal assembly 314 are rotated downwardly about the hinge line 130 by the first actuator relative to the first and second upper seal assemblies 312, 316 and the wing 110. In the illustrated example of FIG. 3, the second rigid region 134 is rotated downwardly about the hinge line 130 by the second actuator relative to the first and second upper seal assemblies 312, 316 and the wing 110. In the illustrated example of FIG. 3, the third rigid region 136, the first inboard cap 120, and the second lower seal assembly 318 are rotated downwardly about the hinge line 130 by the third actuator relative to the first and second upper seal assemblies 312, 316 and the wing 110. Thus, the first and second lower seal assemblies 314, 318 and the flexible portion 114 are articulated downwardly relative to the first and second upper seal assemblies 312, 316, and the wing 110 about the hinge line 130. Thus, the articulated control surface 112 forms an abrupt downward change in the airfoil surface 124.

In the illustrated example of FIG. 3, the first rigid region 132, the first outboard cap 122, and the first lower seal assembly 314 are held stationary in a downward first position 320 by the first actuator and the third rigid region 136, the first inboard cap 120, and the second lower seal assembly 318 are held stationary by the third actuator in the downward first position 320 while the second rigid region 134 is rotated to a further downward second position 322 by the second actuator. Thus, the first and second flexible regions 138, 140 are flexed. Thus, in the example of FIG. 3, while the control surface 112 is articulated downwardly relative to the wing 110, a smooth deflection is formed in the trailing edge 144 along the flexible portion 114. In some examples, the second rigid region 134 is rotated to the downward first position 320 by the second actuator such that the first and second flexible regions 138, 140 are not flexed (not shown in FIG. 3). In some examples, the first and third rigid regions 132, 136 are rotated to the downward second position 322 while the second rigid region 134 is rotated to the downward first position 320 to flex the first and second flexible regions 138, 140 (not shown in FIG. 3).

Figure 4:
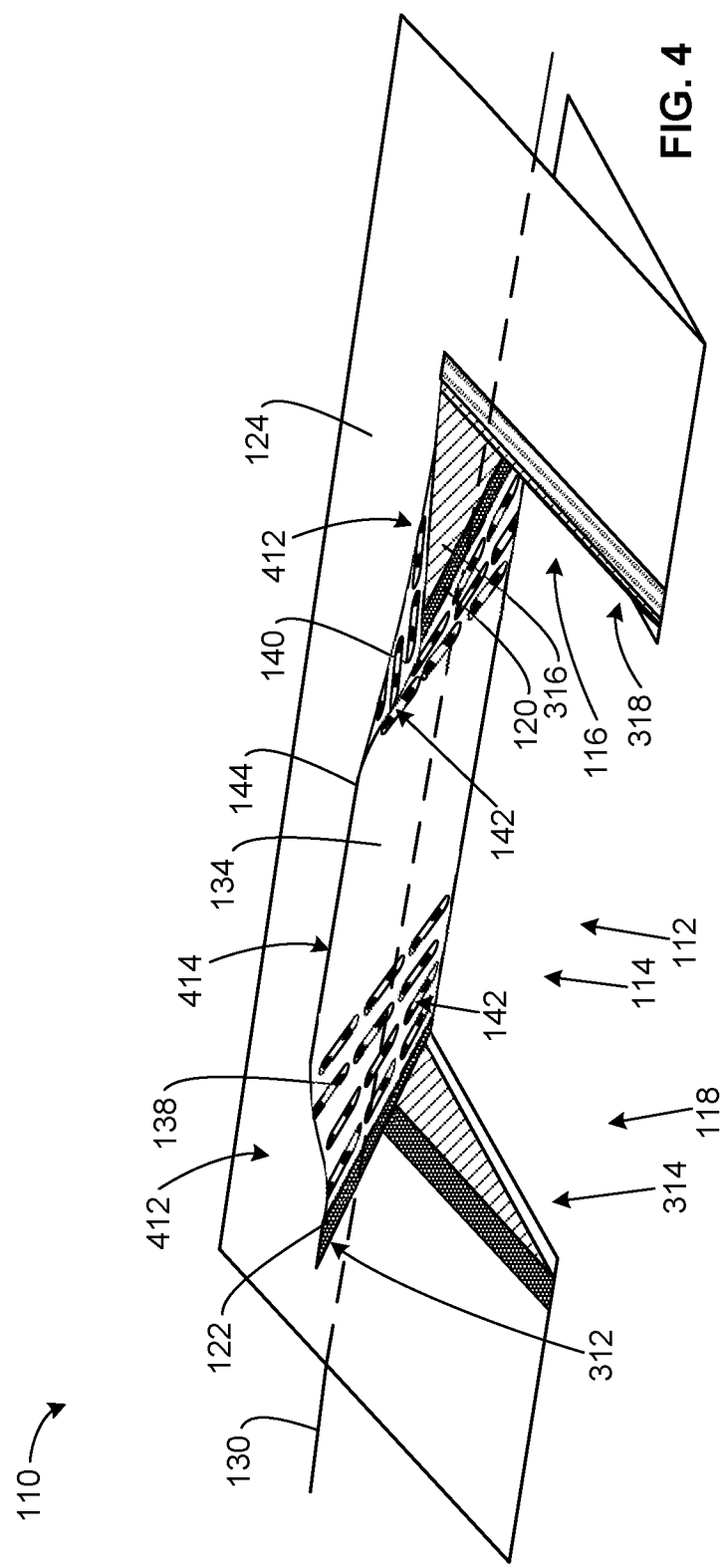
FIG. 4 illustrates the example control surface of FIG. 1 articulated upwardly.

FIG. 4 illustrates the example control surface 112 of FIG. 1 articulated upwardly. In the illustrated example of FIG. 4, the first rigid region 132 (hidden in FIG. 4), the first outboard cap 122, and the first upper seal assembly 312 are rotated upwardly about the hinge line 130 by the first actuator relative to the first and second lower seal assemblies 314, 318 and the wing 110. In the illustrated example of FIG. 3, the second rigid region 134 is rotated upwardly about the hinge line 130 by the second actuator relative to the first and second lower seal assemblies 314, 318 and the wing 110. In the illustrated example of FIG. 3, the third rigid region 136 (hidden in FIG. 4), the first inboard cap 120, and the second upper seal assembly 316 are rotated upwardly about the hinge line 130 by the third actuator relative to the first and second lower seal assemblies 314, 318 and the wing 110. Thus, the first and second upper seal assemblies 312, 316 and the flexible portion 114 are articulated upwardly relative to the first and second lower seal assemblies 314, 318, and the wing 110 about the hinge line 130 (hidden in FIG. 4 and denoted as a dashed line). Thus, the articulated control surface 112 forms an abrupt upward change in the airfoil surface 124.

In the illustrated example of FIG. 4, the first rigid region 132, the first outboard cap 122, and the first upper seal assembly 312 are held stationary in an upward first position 412 by the first actuator and the third rigid region 136, the first inboard cap 120, and the second upper seal assembly 316 are held stationary in the upward first position 412 by the third actuator while the second rigid region 134 is rotated to a further upward second position 414 by the second actuator. Thus, the first and second flexible regions 138, 140 are flexed. Thus, while the control surface 112 is articulated upwardly relative to the wing 110, a smooth deflection is formed in the trailing edge 144 along the flexible portion 114. In some examples, the second rigid region 134 is rotated to the upward first position 412 by the second actuator such that the first and second flexible regions 138, 140 are not flexed (not shown in FIG. 4). In some examples, the first and third rigid regions 132, 136 are rotated to the upward second position 414 while the second rigid region 134 is rotated to the upward first position 412 to flex the first and second flexible regions 138, 140 (not shown in FIG. 4).

Figure 5:
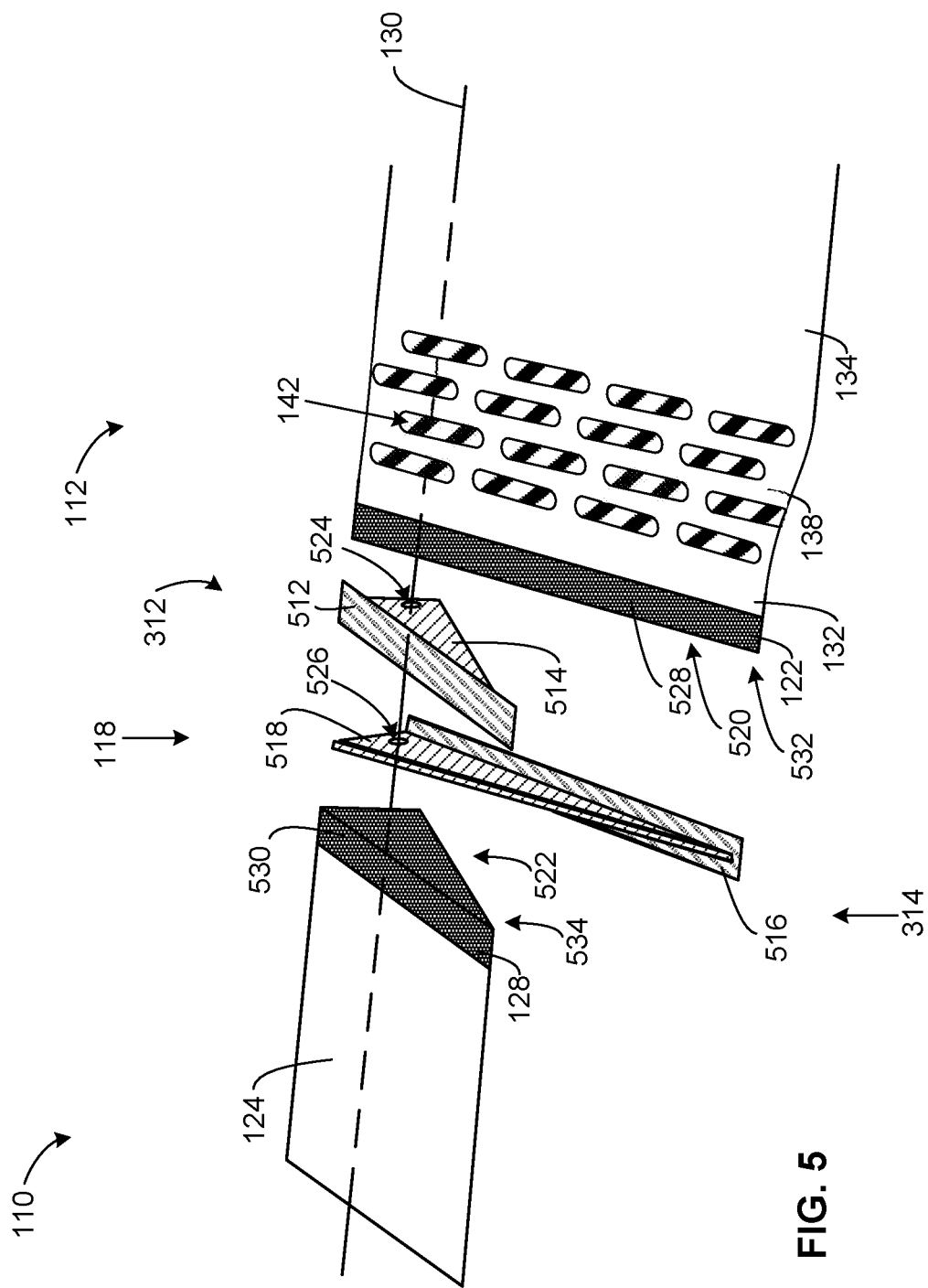
FIG. 5 is a partial exploded view of the example control surface of FIG. 1.

FIG. 5 is a partial exploded view of the example control surface 112 of FIG. 1. In the illustrated example of FIG. 5, the first upper seal assembly 312 of the outboard articulating seal 118 includes a first upper flap 512 and a first upper rib 514. The first lower seal assembly 314 of the outboard articulating seal 118 includes a first lower flap 516 and a first lower rib 518.

The second upper seal assembly 316 of the inboard articulating seal 116 (not pictured in FIG. 5) correspondingly includes a second upper flap and a second upper rib (not pictured in FIG. 5). The second lower seal assembly 318 of the inboard articulating seal (not pictured in FIG. 5) correspondingly includes a second lower flap and a second lower rib (not pictured in FIG. 5).

The first outboard cap 122 covers an outboard end 520 of the control surface 112. The second outboard cap 128 covers a first face 522 and a portion of the airfoil surface 124 of the wing 110. The first upper rib 514 includes a first hinge engagement hole 524. The first lower rib 518 includes a second hinge engagement hole 526. The first upper seal assembly 312 and the first lower seal assembly 314 rotate relative to one another about the hinge line 130 (depicted as a line in FIG. 5) via the first and second hinge engagement holes 524, 526.

The second upper and lower ribs correspondingly respectively include a third hinge engagement hole and a fourth hinge engagement hole (not pictured in FIG. 5). The second upper seal assembly 316 and the second lower seal assembly 318 (not pictured in FIG. 5) rotate relative to one another about the hinge line 130 via the third and fourth hinge engagement holes.

In operation, the first upper flap 512 and the second upper flap selectively sealingly bridge an upper surface 528 of the control surface 112 and an upper portion 530 of the airfoil surface 124. In operation, the first lower flap 516 and the second lower flap selectively sealingly bridge a lower surface 532 of the control surface 112 and a lower portion 534 of the airfoil surface 124.

Figure 6:
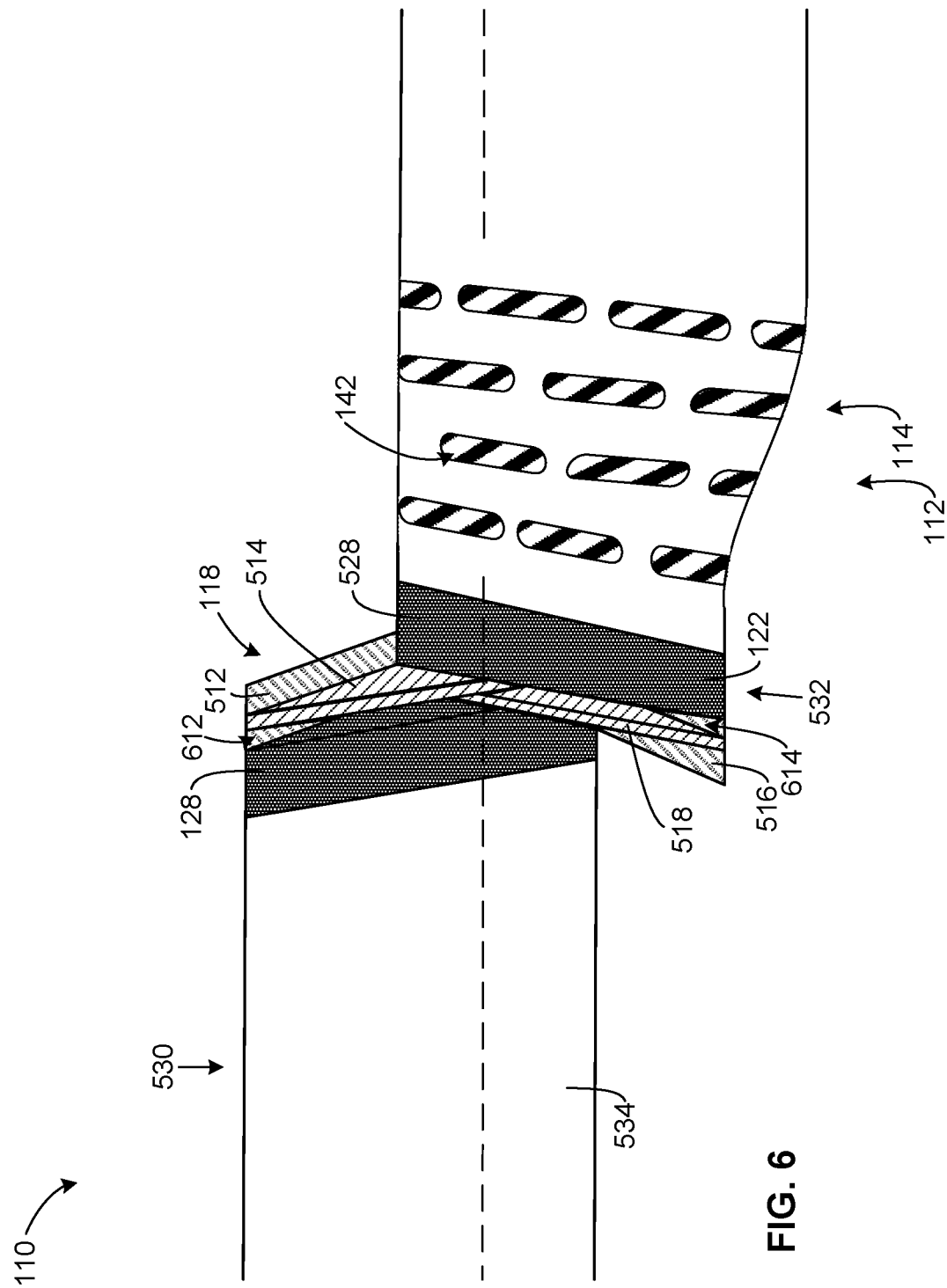
FIG. 6 is a bottom view of the example control surface of FIG. 1 articulated downwardly.

FIG. 6 is a bottom view of the example control surface 112 of FIG. 1 articulated downwardly. In the illustrated example of FIG. 6, the first upper flap 512 is engaged with the upper portion 530 and the upper surface 528 is rotated away from the upper flap 512. The first lower flap 516 is engaged with the lower surface 532 and rotated away from the lower portion 534. Articulating the outboard articulating seal 118 forms a first outboard gap 612 between the first lower rib 518 and the second outboard cap 128 and a second outboard gap 614 between the first upper rib 514 and the first outboard cap 122.

Correspondingly, articulating the inboard articulating seal 116 forms a first inboard gap between the second lower rib and the second inboard cap 126 and a second inboard gap between the second upper rib and the first inboard cap 120 (not pictured in FIG. 6).

Figure 7:
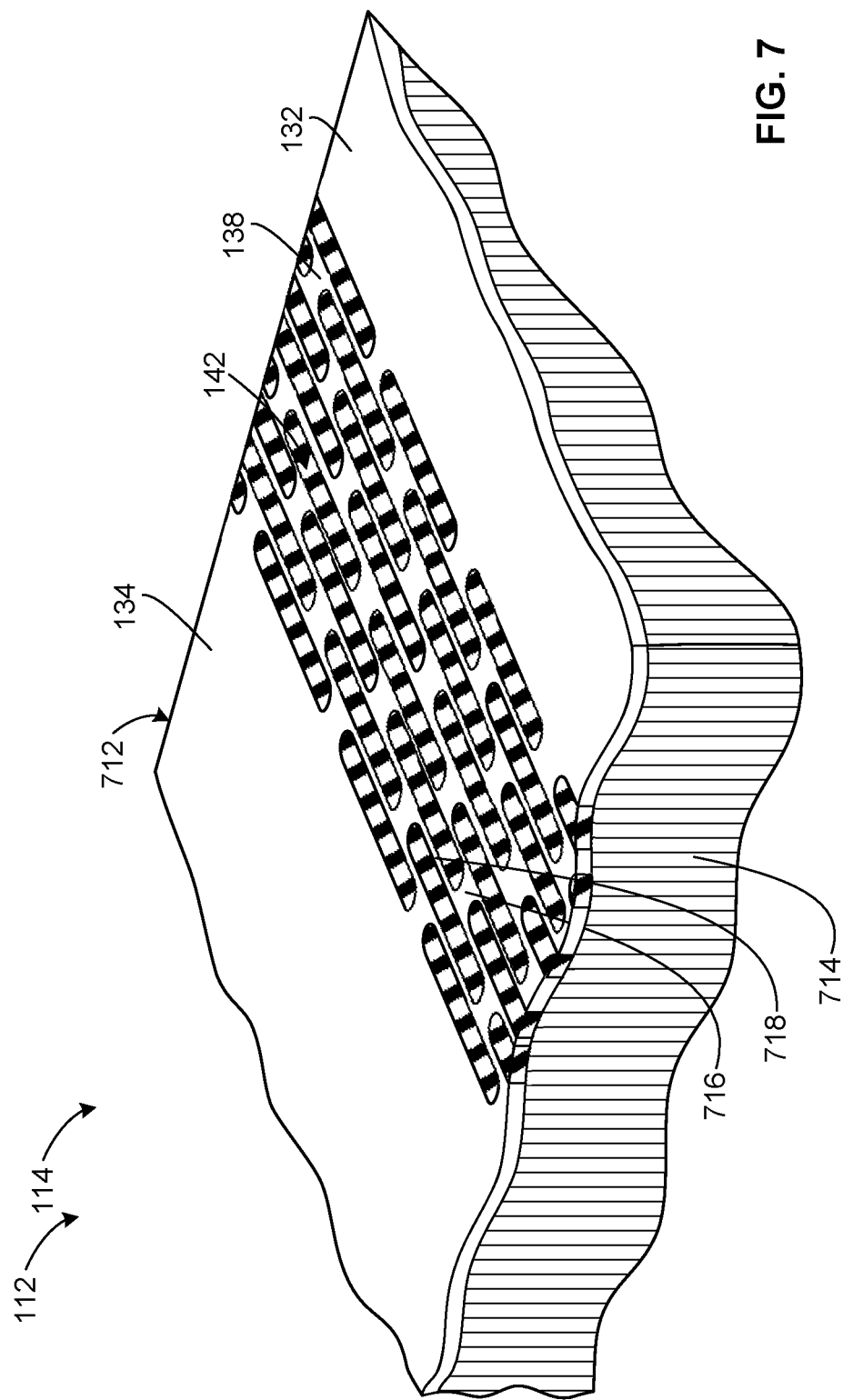
FIG. 7 is an enlarged cutaway perspective view of a flexible portion of the control surface of FIG. 1.

FIG. 7 is an enlarged perspective cutaway view of the flexible portion 114 of the control surface 112 of FIG. 1. In the illustrated example of FIG. 7, the flexible portion 114 includes a skin 712 and a flexible core 714. The flexible core 714 is generally wedge-shaped. The skin 712 includes the perforations 142 (e.g., holes, punctures, etc.) filled with an elastomer (e.g., rubber, synthetic rubber, silicone, silicone rubber, fluorosilicone, thermoplastic elastomer, ethylene-vinyl acetate, polyether block amide, chlorosulfonated polyethylene, etc.). The perforations 142 are defined by interconnected transverse supports 716 and longitudinal links 718 of the skin 712. Although the perforations 142 are depicted as rounded rectangular openings in FIG. 7, the perforations 142 may be any shape (e.g., quadrilateral, triangular, hexagonal, circular, polygonal, etc.). The skin 712 is adhered (e.g., glued, epoxied, cemented, pasted, etc.) to the flexible core 714. Perforated portions of the skin 712 are bonded to the core 714 using a flexible adhesive (silicone, fluorosilicone, thermoplastic elastomer, polysulfide, flexible epoxy, etc.). Unperforated portions of the skin 712 are bonded to the core 714 using a rigid adhesive (epoxy, cynate ester, bismaleimide, polyimide, etc.). The first flexible region 138 is formed where the elastomer-filled perforations 142 are adjacent to the flexible core 714. The second flexible region 140 is likewise formed by elastomer-filled perforations in the skin 712 adjacent to the flexible core 714 (not pictured in FIG. 7). The first and second rigid regions 132, 134 are formed where unperforated portions of the skin 712 are adjacent to the flexible core 714. In other words, where unperforated portions of the skin 712 are adhered to the flexible core 714, the flexible portion 114 is rigid and where portions of the skin 712 including elastomer-filled perforations 142 are adhered to the flexible core 714, the flexible portion 114 is flexible. Additionally or alternatively, the perforated and unperforated portions of the skin 712 may formed from different materials joined via mechanical fasteners and/or adhered together.

Figure 8:
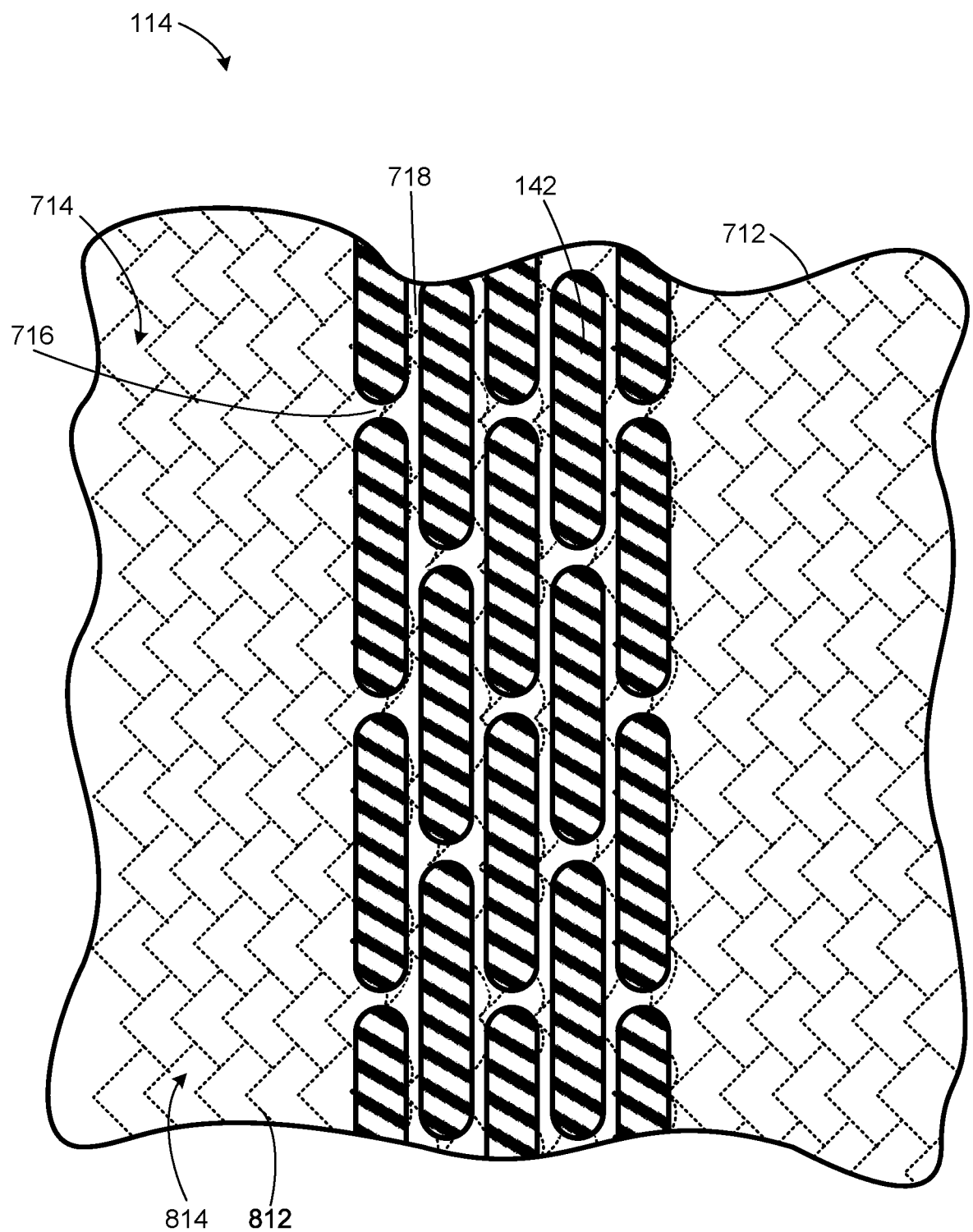
FIG. 8 is an enlarged top view of the flexible portion of FIG. 7.

FIG. 8 is an enlarged top view of the flexible portion 114 of FIG. 7. In the illustrated example of FIG. 8, the flexible core 714 is a corrugated structure including corrugations 812 (shown in phantom) defining a matrix of cells 814. The flexible core 714 may be formed of any corrugated material (e.g., meta-aramid paper, polyethylene paper, carbon fiber thermoplastic composite, fiberglass fiber thermoplastic composite, metallic foil, carbon fiber thermoset composite, fiberglass thermoset composite, pressboard, etc.). In the illustrated example of FIG. 8, although the corrugations 812 are depicted as chevron-shaped and as scallop-shaped, the corrugations 812 may be any shape (e.g., rectilinear, hexagonal, polygonal, rounded, circular, etc.). In the illustrated example of FIG. 8, the scallop-shaped corrugations 812 are located adjacent to a portion of the skin 712 including the elastomer-filled perforations 142 and the chevron-shaped corrugations 812 are located adjacent to unperforated portions of the skin 712. The corrugations 812 transition from chevron-shaped to scallop-shaped adjacent to where the skin 712 transitions from being unperforated to including elastomer-filled perforations 142 and vice versa. Differing shapes of the corrugations 812, transverse supports 716, longitudinal links 718, and/or perforations 142 may provide differing stiffnesses to the flexible portion 114.

Additionally or alternatively, the materials of the flexible core 714 and of the skin 712 may be shaped (e.g., molded, cut, extruded, perforated, etc.) and bonded to form additional aircraft structures (e.g., the wing 110 of FIG. 1, fuselages, elevators, rudders, etc.). In some such examples, the aircraft structures may include one or more flexible regions (e.g., regions with elastomer-filled perforations in the skin material) to provide a variable internal volume of the aircraft (e.g., to provide additional storage, to change the aerodynamic characteristics of the aircraft, etc.).

Figure 9:
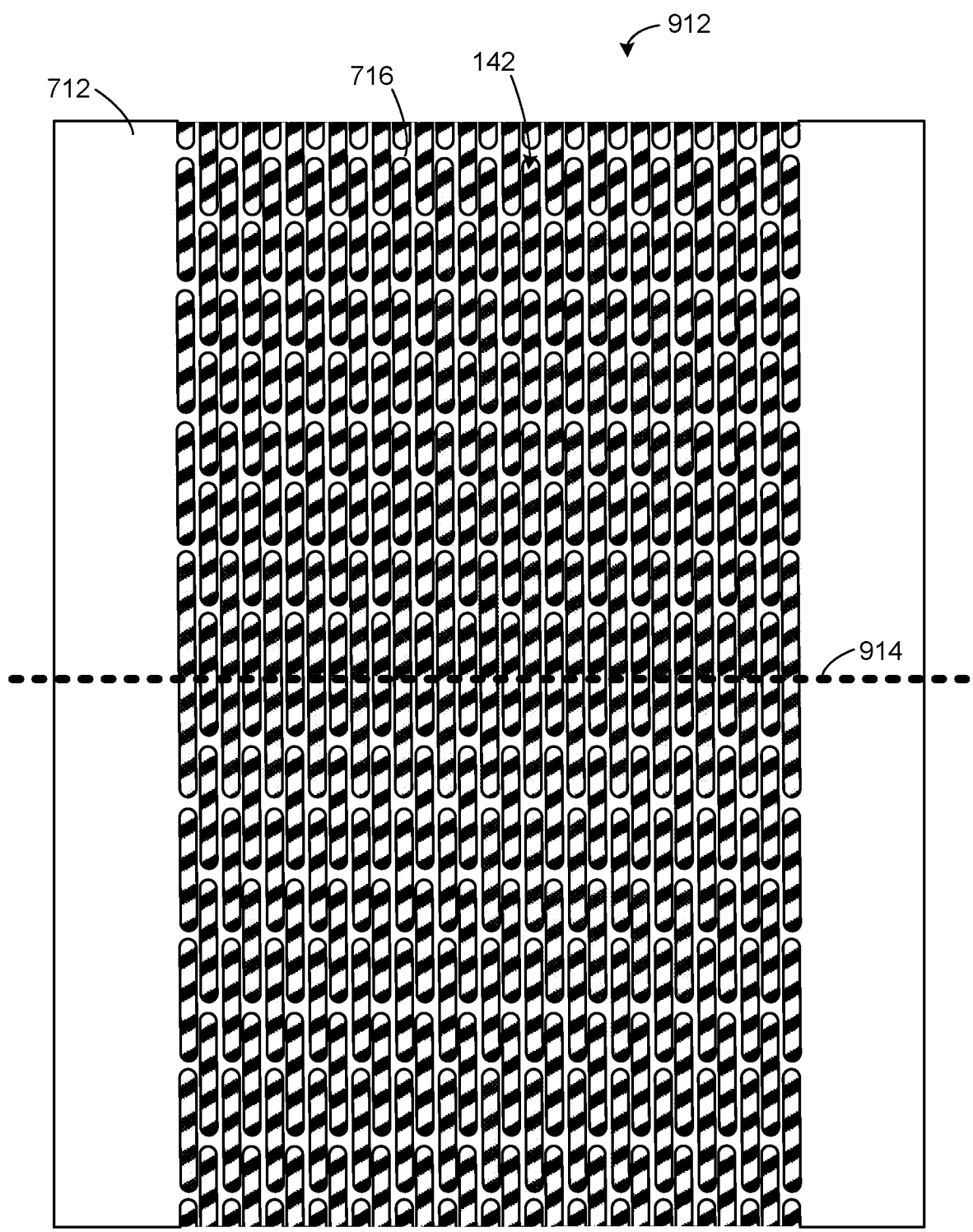
FIG. 9 is a top view of the skin used to form the flexible portion of FIG. 7.

FIG. 9 is a top view of the skin 712 used to form the flexible portion 114 of FIG. 7. In the illustrated example of FIG. 9, the perforations 142 are arranged in a pattern 912 (e.g., a lattice, a grid, a trellis, a web, etc.) that includes a discontinuity 914 (denoted along a dashed line) along which no transverse supports 716 are present. The skin 712 may be bent along the discontinuity 914 when conforming the skin 712 into the airfoil shape of the flexible portion 114, described in greater detail in conjunction with FIGS. 10-11. The skin 712 may be formed of any sheet-type material (e.g., sheet metal, plastic, fiberglass, carbon fiber, plastic, fiber reinforced thermoset composite laminate, fiber reinforced plastic composite laminate, fiber reinforced polyimide composite laminate, etc.). The perforations 142 may be cut into the skin 712 and then filled with the elastomer. Thus, the elastomer-filled perforations 142 form a sealed flat spring.

Figure 10:
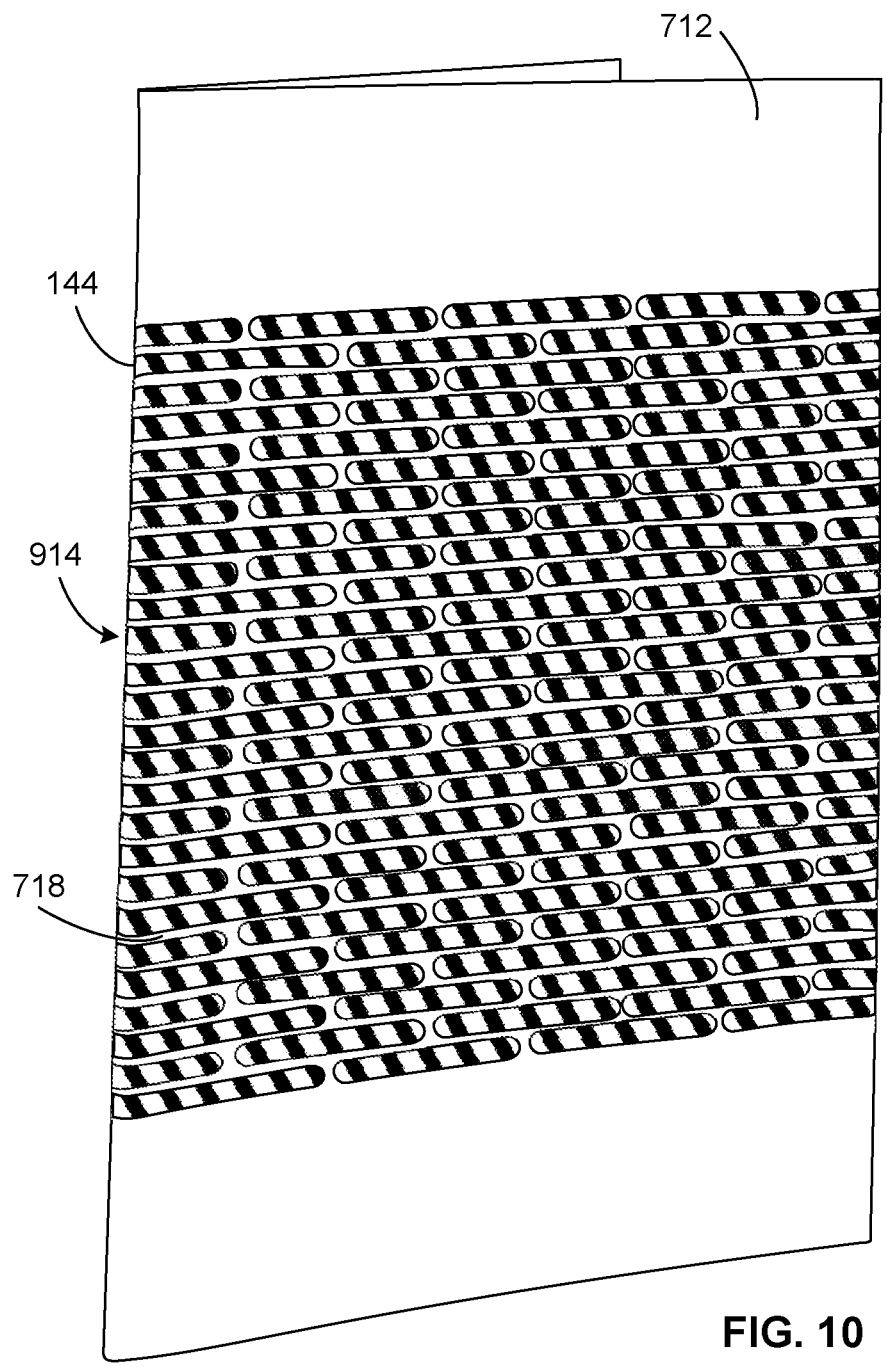
FIG. 10 is a view of the skin of FIG. 9 conformed to the airfoil shape of the flexible portion of FIG. 7.

FIG. 10 is a view of the skin 712 of FIG. 9 conformed to the airfoil shape of the flexible portion 114 of FIG. 7. In the illustrated example of FIG. 10, the skin 712 is bent along the discontinuity 914. The discontinuity 914 may aid in conforming the skin 712 to the airfoil shape because less skin 712 material is present along the discontinuity 914. Further, the discontinuity 914 may aid in smoothly deflecting the trailing edge 144 because the longitudinal links 718 along the discontinuity 914 are free to move relative to one another.

Figure 11:
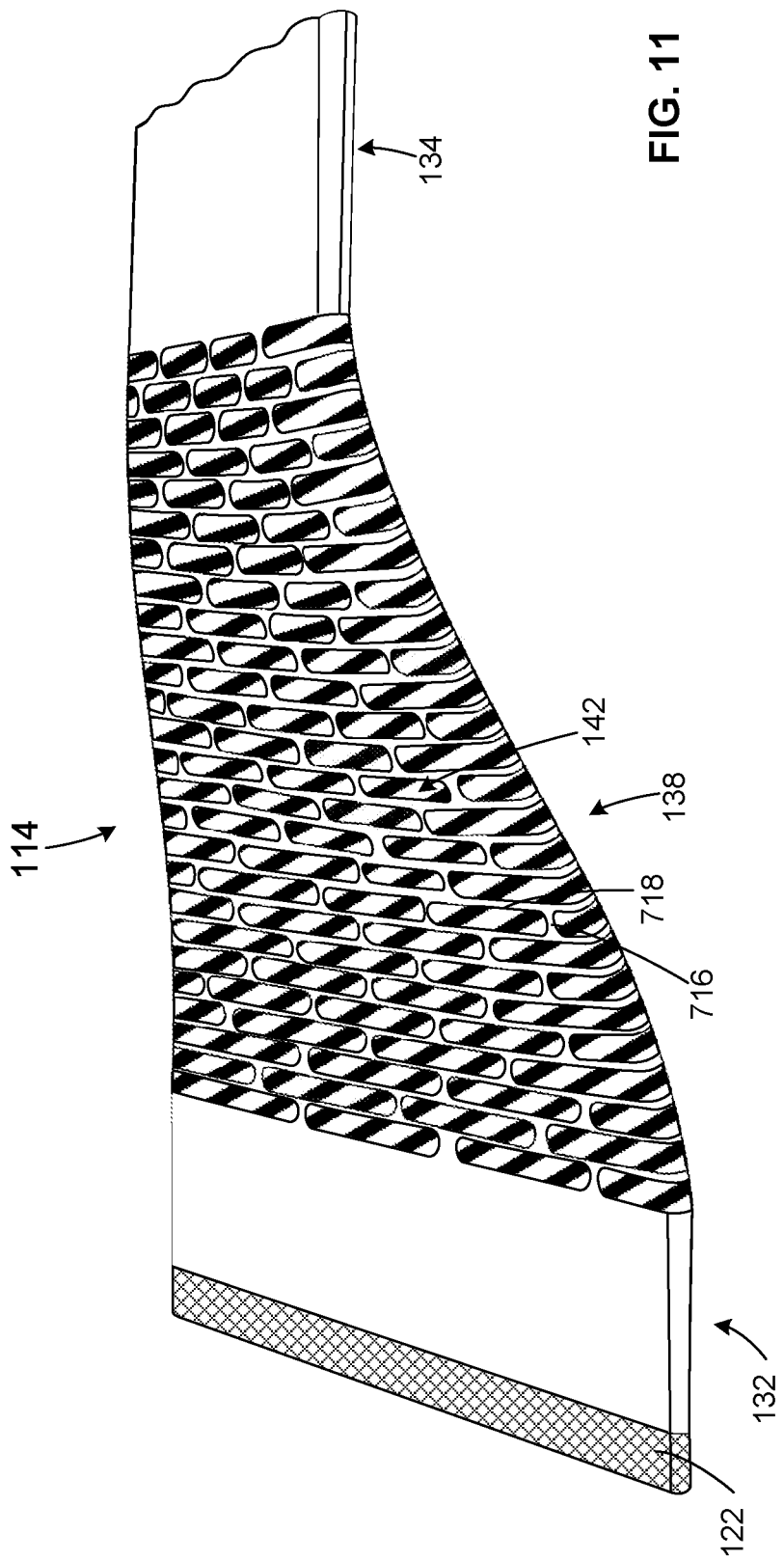
FIG. 11 is an enlarged cutaway view of the flexible portion of FIG. 7 in the upwardly flexed position of FIG. 2.

FIG. 11 is an enlarged cutaway view of the flexible portion 114 of FIG. 7 in the upwardly flexed position of FIG. 2. In the illustrated example of FIG. 11, the first outboard cap 122 is adhered to a portion of the first rigid region 132 and the flexible core 714 (hidden in FIG. 11) to seal the flexible core 714. In operation, the transverse supports 716, the longitudinal links 718, the elastomer filling the perforations 142 and the flexible core 714 of the first flexible region 138 bend as the second rigid region 134 is rotated relative to the first rigid region 132.

Figure 12:
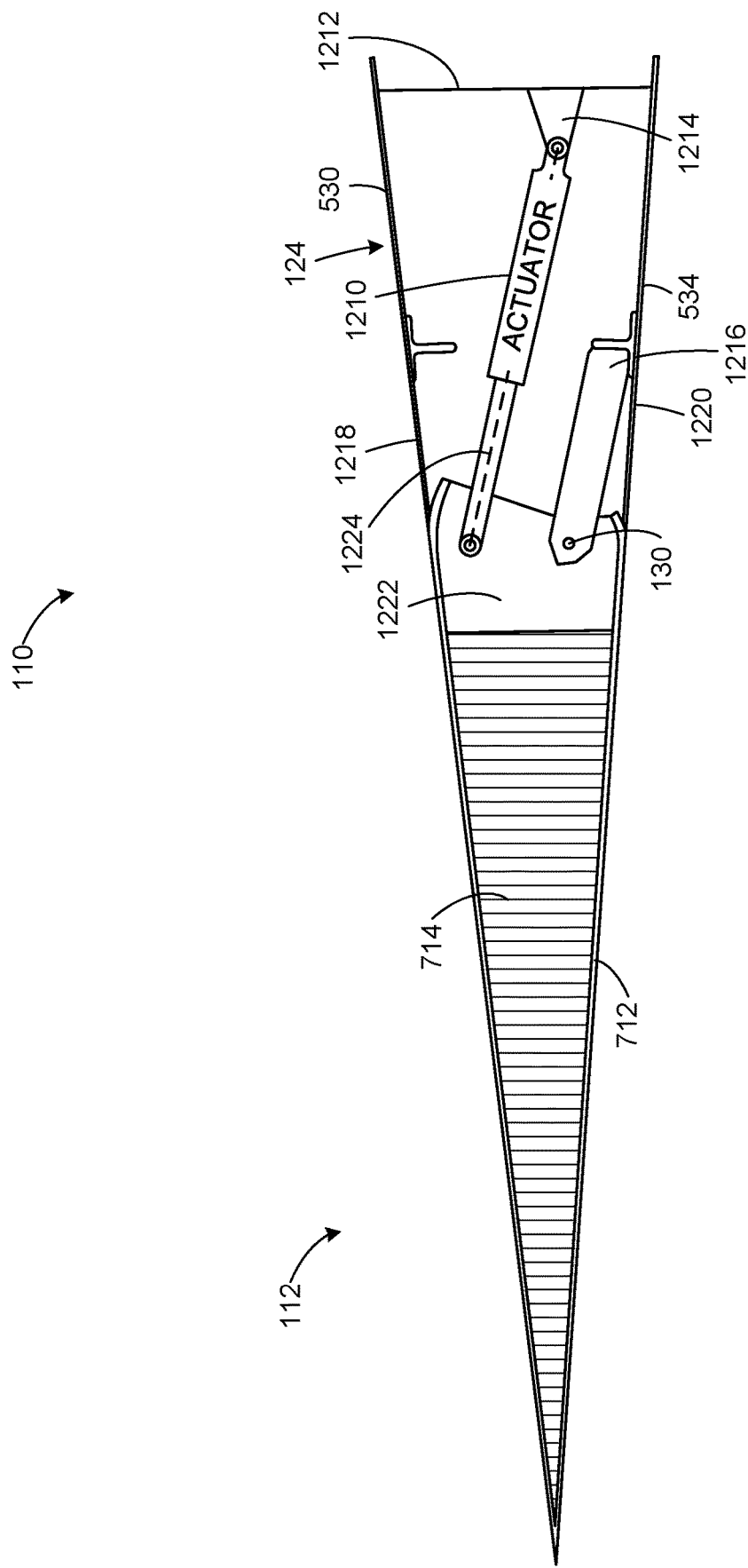
FIG. 12 is a cross-sectional view of the control surface and the wing of FIG. 1.

FIG. 12 is a cross-sectional view of the control surface 112 and the wing 110 of FIG. 1. In the illustrated example, the second actuator 1210 and the hinge line 130 described above are visible. In the illustrated example, the wing 110 further includes a closeout structure 1212, a first bracket 1214, and a second bracket 1216. The upper portion 530 of the airfoil surface 124 includes an upper hinge cover 1218. The lower portion 534 of the airfoil surface 124 includes a lower hinge cover 1220. The control surface 112 includes an actuation member 1222. The second actuator 1210 includes an arm 1224. The second bracket 1216 is attached to the lower portion 534 and supports the hinge line 130. The closeout structure 1212 is attached to the upper and lower portions 530, 534 of the airfoil surface 124. The first bracket 1214 is attached to the closeout structure 1212. The second actuator 1210 is attached to the first bracket 1214. The actuation member 1222 is connected to the arm 1224 and rotatably engaged with the hinge line 130. The actuation member 1222 is adhered to the skin 712 and to the flexible core 714 to seal (e.g., encapsulate) the flexible core 714. In some examples, the actuation member 1222 includes an interfacing cap to adhere the actuation member 1222 to the flexible core 714 (not shown in FIG. 12). The skin 712 is slidably engaged with the upper and lower hinge covers 1218, 1220.

In operation, the second actuator 1210 extends and retracts the arm 1224 to rotate the control surface 112 about the hinge line 130. The upper and lower hinge covers 1218, 1220 bend and slide on the skin 712 to seal the control surface 112 to the wing 110 as the control surface 112 rotates.

Figure 13:
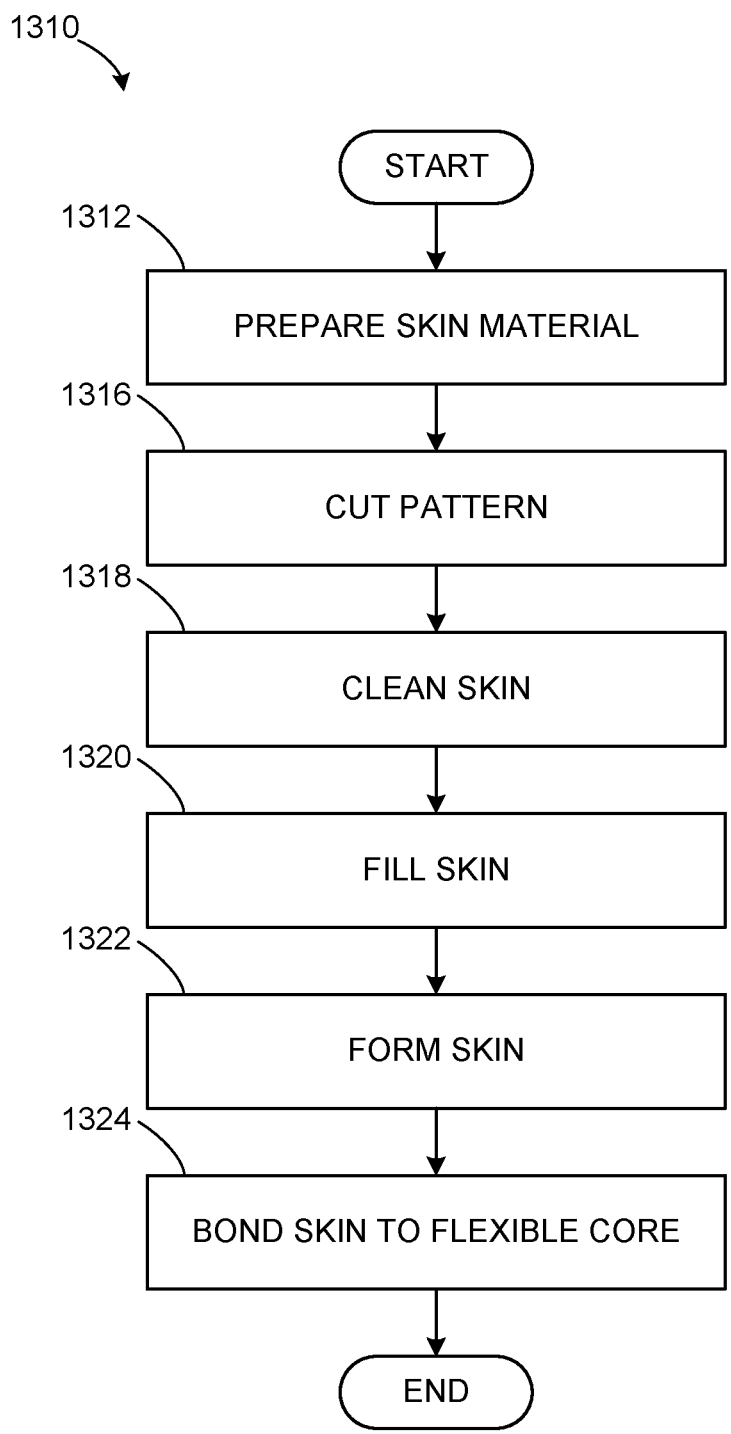
FIG. 13 is a flowchart of a method that may be performed to produce the example flexible portion of FIGS. 1, 2, 3, 4, 5, 6, 7, 8, 12, and/or 13.

FIG. 13 is a flowchart of a method 1310 that may be performed to produce the example flexible portion 114 of FIGS. 1, 2, 3, 4, 5, 6, 7, 8, 12, and/or 12. Initially, the skin 712 is prepared (block 1312). For example, at block 1312, a sheet of fiberglass fabric may be saturated with epoxy and cured, a sheet of sheet metal may be unfurled, a sheet of plastic may be extruded, etc. Then, the perforations 142 are cut into the skin 712 to form the pattern 912 (block 1316). For example, at block 1316, the perforations 142 may be cut by machining, water jet cutting, die cutting, laser cutting, plasma cutting, etc. Additionally, or alternatively, at block 1316, the perforations 142 may be molded into the skin 712. Next, the skin 712 is cleaned (block 1318). For example, at block 1318, stray fiberglass threads may be cut, abraded, and/or burned away from the skin 712, burrs may be removed, sharp edges and/or corners may be filed, etc. Further, the perforations 142 are filled with the elastomer (block 1320). For example, at block 1320, the elastomer may be poured, scooped, spread, injected, molded, etc. into the perforations 142. Then, the skin 712 is formed (e.g., bent over a fixture, pressed in a die, rolled, etc.) into an airfoil shape (block 1322). Next, the skin 712 is bonded (e.g., adhered, epoxied, glued, etc.) to the flexible core 714 (block 1324). In some examples, a flexible first adhesive bonds the flexible core 714 to perforated portions of the skin 712. In some examples, a rigid second adhesive bonds the flexible core 714 to unperforated (e.g., solid) regions of the skin 712. The method 1310 then ends.

From the foregoing, it will be appreciated that the above disclosed flexible control surfaces and related methods provide control surfaces for aircraft wings that may be deflected to maneuver the aircraft while maintaining smooth (e.g., efficient) airflow over the airfoil surface of the wing. Further, the disclosed flexible control surfaces and related methods provide lightweight and robust structures. Utilizing the disclosed flexible control surfaces and related methods in aircraft manufacture may increase the fuel efficiency and/or range of aircraft. Additionally, the disclosed flexible control surfaces and related methods provide control surfaces that deflect airflow for relatively small flight path adjustments and for large maneuvers. Thus, the number of structures required in an aircraft wing to control the aircraft and associated production and maintenance costs may be reduced.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
  a control surface of an aircraft, the control surface having a flexible core and a skin coupled to and covering the flexible core, the skin including a flexible region located between a first rigid region and a second rigid region of the skin, the flexible region being defined by a plurality of elastomer-filled perforations.

2. The apparatus of claim 1, wherein the flexible region is configured to enable deflection of the second rigid region relative to the first rigid region.

3. The apparatus of claim 2, wherein the flexible region forms a continuous smooth transition of the skin between the first and second rigid regions.

4. The apparatus of claim 1, wherein the elastomer-filled perforations are formed in a pattern defined by transverse supports and longitudinal links of the skin.

5. The apparatus of claim 4, wherein the pattern includes a discontinuity of the transverse supports, the skin being bent along the discontinuity.

6. The apparatus of claim 1, wherein the flexible core includes a matrix of cells.

7. The apparatus of claim 1, further comprising an articulating seal configured to extend over a gap formed between the control surface and a wing portion of the aircraft adjacent the control surface.

8. The apparatus of claim 7, wherein the articulating seal includes:
   a first flap rigidly coupled to a first rib of the articulating seal, the first rib being movable relative to the control surface and relative to the wing portion, the first flap configured to selectively sealingly bridge a first portion of the gap located along an upper surface of the control surface; and
   a second flap rigidly coupled to a second rib of the articulating seal, the second rib being movable relative to the control surface, relative to the wing portion, and relative to the first rib, the second flap configured to selectively sealingly bridge a second portion of the gap located along a lower surface of the control surface.

9. The apparatus of claim 1, wherein the elastomer-filled perforations extend through a thickness of the skin.

10. The apparatus of claim 1, wherein the flexible region is configured to enable the second rigid region to be flexed upwardly relative to the first rigid region.

11. The apparatus of claim 1, wherein the flexible region is configured to enable the second rigid region to be flexed downwardly relative to the first rigid region.

12. The apparatus of claim 1, wherein the first rigid region is coupled to a first actuator, and the second rigid region is coupled to a second actuator.

13. The apparatus of claim 1, wherein the control surface is a trailing edge control surface.

14. The apparatus of claim 1, wherein the control surface is movable relative to a wing of the aircraft.

15. The apparatus of claim 14, wherein the control surface is rotatable about a hinge line defined by the wing.

16. The apparatus of claim 15, wherein the second rigid region is spaced apart from the first rigid region in a direction extending along the hinge line.

17. The apparatus of claim 15, wherein the first and second rigid regions are configured to be rotated upwardly about the hinge line relative to an upper portion of the wing.

18. The apparatus of claim 15, wherein the first and second rigid regions are configured to be rotated downwardly about the hinge line relative to a lower portion of the wing.

19. An apparatus, comprising:
   a control surface of an aircraft, the control surface having a flexible core and a skin coupled to and covering the flexible core, the skin including a flexible region located between a first rigid region and a second rigid region of the skin, the flexible region being defined by a plurality of elastomer-filled perforations, the elastomer-filled perforations extending through a thickness of the skin.

20. An apparatus, comprising:
   a control surface of an aircraft, the control surface having a flexible core and a skin covering and supported by the flexible core, the skin including a flexible region located between a first rigid region and a second rigid region of the skin, the flexible region being defined by a plurality of elastomer-filled perforations.

* * * * *

UNITED STATES PATENT AND TRADEMARK OFFICE
CERTIFICATE OF CORRECTION

PATENT NO. : 10,549,838 B2  
APPLICATION NO. : 15/452993  
DATED : February 4, 2020  
INVENTOR(S) : Etling et al.

Page 1 of 1

It is certified that error appears in the above-identified patent and that said Letters Patent is hereby corrected as shown below:

In the Claims

Column 8, Claim 1, Line 52, replace "An apparatus comprising:" with --An apparatus, comprising:--

Signed and Sealed this  
Thirty-first Day of March, 2020

Andrei Iancu  
*Director of the United States Patent and Trademark Office*